(12) United States Patent
Whitehead

(10) Patent No.: US 6,397,147 B1
(45) Date of Patent: May 28, 2002

(54) RELATIVE GPS POSITIONING USING A SINGLE GPS RECEIVER WITH INTERNALLY GENERATED DIFFERENTIAL CORRECTION TERMS

(75) Inventor: Michael L. Whitehead, Scottsdale, AZ (US)

(73) Assignee: CSI Wireless Inc., Alberta (CA)

( * ) Notice: Subject to any disclaimer, the term of this patent is extended or adjusted under 35 U.S.C. 154(b) by 0 days.

(21) Appl. No.: 09/695,608

(22) Filed: Oct. 24, 2000

Related U.S. Application Data

(60) Provisional application No. 60/209,747, filed on Jun. 6, 2000.

(51) Int. Cl.[7] .............. G01S 5/02; F41G 1/00; H04B 7/185
(52) U.S. Cl. .............. 701/213; 701/207; 701/214; 342/357.02
(58) Field of Search .............. 701/213, 207, 701/214, 225, 215; 342/357.02, 357.06, 357.08, 357.03, 357.11, 356

(56) References Cited

U.S. PATENT DOCUMENTS

| | | | | |
|---|---|---|---|---|
| 4,812,991 A | * | 3/1989 | Hatch | 364/458 |
| 4,813,991 A | | 3/1989 | Hatch | 364/458 |
| 5,148,179 A | | 9/1992 | Allison | 342/357 |
| 5,155,490 A | | 10/1992 | Spradley, Jr. et al. | 342/357 |
| 5,323,322 A | | 6/1994 | Mueller et al. | 364/449 |
| 5,345,245 A | | 9/1994 | Ishikawa et al. | 342/357 |
| 5,361,212 A | | 11/1994 | Class et al. | 364/428 |
| 5,390,124 A | | 2/1995 | Kyrtsos | 364/449 |
| 5,416,712 A | | 5/1995 | Geier et al. | 364/450 |
| 5,495,257 A | | 2/1996 | Loomis | 342/357 |
| 5,568,152 A | * | 10/1996 | Janky et al. | 342/357 |
| 5,589,835 A | | 12/1996 | Gildea et al. | 342/357 |
| 5,596,328 A | | 1/1997 | Stangeland | 342/357 |
| 5,621,646 A | | 4/1997 | Enge et al. | 364/449 |
| 5,638,077 A | | 6/1997 | Martin | 342/357 |
| 5,680,140 A | * | 10/1997 | Loomis | 342/357 |
| 5,731,786 A | * | 3/1998 | Abraham et al. | 342/357 |
| 5,828,336 A | | 10/1998 | Yunck et al. | 342/357 |
| 5,899,957 A | | 5/1999 | Loomis | 701/214 |
| 6,014,101 A | * | 1/2000 | Loomis | 342/357.02 |
| 6,055,477 A | * | 4/2000 | McBurney et al. | 701/207 |

OTHER PUBLICATIONS

Bradford W. Parkison and Per K. Enge, Global Positioning Theory and Applications vol. 2, American Institute of Aeronautics and Astronautics, Inc., pp. 3–49, 81–114, 1996.

B. Hofmann–Wellenhof, H. Lichtenegger, and J. Collins, Global Positioning System Theory and Practice, Third, revised edition, Springer–Verlag Wein New York, pp. 132–143, 1994.

RTCA, Inc., RTCA/DO–229A, Minimum Operational Performance Standards for Global Positioning System/Wide Area Augmentation System Airborne Equipment, Jun. 8, 1998.

* cited by examiner

Primary Examiner—Tan Nguyen
Assistant Examiner—Dalena Tran
(74) Attorney, Agent, or Firm—Cantor Colburn LLP

(57) ABSTRACT

A technique of accurately determining the relative position between two points, in real-time, using a single GPS receiver that makes measurements of signals transmitted from GPS satellites. A technique is applied where differential correction terms are computed as a location at an instant of time, and then applied to further times, after applying atmospheric delay adjustments, so that the position of the GPS receiver is determined accurately relative to the position at the original instant of time.

57 Claims, 4 Drawing Sheets

RELATIVE GPS POSITIONING USING A SINGLE GPS RECEIVER WITH INTERNALLY GENERATED DIFFERENTIAL CORRECTION TERMS

CROSS REFERENCE TO RELATED APPLICATIONS

This application claims the benefit of U.S. Provisional Application 60/209,747, filed Jan. 6, 2000, which is incorporated by references.

BACKGROUND OF THE INVENTION

1. Field of the Invention

The invention relates generally to Global Positioning System (GPS) receivers and more particularly to a method for computing a precise relative location using a single differential GPS receiver that acts as a reference station by generating differential correction terms, and then subsequently as a remote receiver unit by using the differential correction terms.

2. Background

The Global Positioning System (GPS) was established by the United States government, and employs a constellation of 24 or more satellites in well-defined orbits at an altitude of approximately 26,500 km. These satellites continually transmit microwave L-band radio signals in two frequency bands, centered at 1575.42 MHz and 1227.6 MHz., denoted as L1 and L2 respectively. These signals include timing patterns relative to the satellite's onboard precision clock (which is kept synchronized by a ground station) as well as a navigation message giving the precise orbital positions of the satellites, an ionosphere model, and other useful information. GPS receivers process the radio signals, computing ranges to the GPS satellites, and by triangulating these ranges, the GPS receiver determines its position and its internal clock error.

In standalone GPS systems that determine a receiver's position coordinates without reference to a nearby reference receiver, the process of position determination is subject to errors from a number of sources. These include errors in the GPS satellite's clock reference, the location of the orbiting satellite, ionosphere induced propagation delay errors, and troposphere refraction errors. A discussion of these sources of error is given in more detail in U.S. Pat. No 5,828,336 by Yunck, et al.

To overcome the errors of the standalone GPS system, many kinematic positioning applications, including applications of GPS to precision farming, have made use of data from multiple GPS receivers. Typically, in such applications, a reference receiver, located at a reference site having known coordinates, receives the GPS satellite signals simultaneously with the receipt of signals by a remote receiver. Depending on the separation distance between the two GPS receivers, many of the errors mentioned above will affect the satellite signals equally for the two receivers. By taking the difference between signals received both at the reference site and at the remote location, the errors are effectively eliminated. This facilitates an accurate determination of the remote receiver's coordinates relative to the reference receiver's coordinates.

The technique of differencing signals from two or more GPS receivers to improve accuracy is known as differential GPS (DGPS). Differential GPS has been well described in literature with two examples cited here: 1) "Global Positioning System: Theory and Applications", volume 2, pp. 3–49, 81–114, edited by Parkinson and Spilker; and 2) "GPS Theory and Practice", Third edition, pp. 132–143 by Hofiann-Wellenhof, Lichtenegger and Collins. Differential GPS has taken on many forms and has been an object of a number of patents (for example, see U.S. Pat. No. 4,812,991 by Hatch, U.S. Pat. No. 5,148,179 by Allison, U.S. Pat. No. 5,155,490 by Spradley, Jr., et al., U.S. Pat. No. 5,361,212 by Class, et al., U.S. Pat. No. 5,495,257 by Loomis, U.S. Pat. No. 5,596,328 by Stangeland, and U.S. Pat. No. 5,638,077 by Martin). It includes local DGPS systems that utilize a single reference receiver delivering corrections to one or more remote receivers and it includes Wide Area Differential GPS (WADGPS) where differential correction terms are generated by combining data from multiple reference GPS receivers spread geographically over a region of intended coverage. Several methods of WADGPS appear in U.S. Pat. No. 5,323,322 by Mueller, et al., U.S. Pat. No. 5,621,646 by Enge, et al., U.S. Pat. No. 5,828,336 by Yunck, et al., and U.S. Pat. No. 5,899,957 by Loomis. In all forms of DGPS, however, the positions obtained by the end user's remote receiver are relative to the position(s) of the reference receivers). Thus, absolute accuracy of any DGPS system depends heavily on the accuracy at which the reference receiver locations were determined when installing or implementing the DGPS system.

Relative accuracy is often all that is desired in many applications involving GPS and in these cases, the reference location need not be extremely accurate relative to any one particular coordinate system. That is, it is not a question of determining so much exact position, but position relative to some starting point with a high degree of accuracy. For example, the primary need for swathing applications that guide farm vehicles applying pesticides or fertilizer is to be able to guide the vehicle so that, relative to an initial swath, the subsequent swaths are at a series of prescribed offsets from the original swath (or from each other). There is often no accuracy requirement on the initial swath, only that subsequent swaths be accurate relative to the initial swath.

Prior to May 1, 2000, the largest portion of the positioning error associated with non-differentially corrected (standalone) GPS resulted from the purposeful dithering of the GPS satellite's clock; a process known as Selective Availability (SA). The U.S. Department of Defense relied on SA as a means to limit GPS accuracy of non-authorized users. Typical position errors resulting from were SA 20 to 60 meters but these errors could be more than 100 meters at times. On midnight of May 1, 2000, the intentional degradation of the Global Positioning System signals was discontinued, perhaps indefinitely.

Even without SA, absolute positioning errors caused by the ionosphere can be tens of meters and orbit-induced errors can be several meters. But these errors tend to be slowly changing, sometimes taking more than 2 hours before a stationary receiver reports a position that significantly different from past reports of position. In some applications, such as the GPS guidance of agricultural aircraft used in applying chemicals, the need for relative accuracy may be well matched to a two-hour duration. In fact, it may take less than an hour to complete a typical spraying job. Thus with SA disabled, employing the method described herein, standalone GPS systems may be used where DGPS systems (with multiple GPS receivers) were once required. For example, in certain precision agriculture applications and other arenas such as surveying or Global Information Systems (GIS) DGPS may no longer be required.

Although it is true that existing standalone GPS technologies can achieve high degrees of relative accuracy for several hours, it cannot be guaranteed. Satellites that are tracked by the GPS receiver and are used in computing the receiver's position may set below the horizon; rise above the horizon; or they may be temporarily blocked from view by an obstruction. Such transitions often cause jumps in the receiver's computed position that maybe larger than a particular application can tolerate. To appreciate why, it is important to understand how the GPS position is computed. In the over-determined case (which is the preferred approach to solving the GPS receiver's position) each of the GPS satellite's range measurements contributes to the position reported by the GPS receiver because each range measurement contains information that is mathematically combined, using a Least-Squares or similar technique, to compute the GPS receiver's position. Furthermore, each satellite's range measurement is corrupted by errors, such as ionosphere induced delay, and each error has a different effect on the final position. The ionosphere model most often used for standalone GPS is the Klobuchar model that is broadcast in the GPS Navigation message arriving from each GPS satellite and this model is often in error by one to several tens of meters. As a satellite range measurement is, for example, removed from the Least-Squares position solution, the computed position will abruptly jump due to the sudden omission of the error source, and the remaining measurements, each having its own error contribution will dictate the new position. These ionospheric delays are errors that DGPS provides the benefit of mitigating but which standalone GPS must rely only on models to combat.

Another scenario for which there are potential jumps in the receiver's computed location is during the updates to the satellite's orbital parameters that are broadcast in the GPS message. These orbital parameters specify the location of the GPS satellites, and ultimately, the location of the GPS receiver depends on the assumed location of the GPS satellites. When the orbital parameters change, there is often an associated jump in the satellite's apparent location, which translates to a jump in reported position of the GPS receiver. Again, when DGPS is used, these jumps are mitigated because the differential corrector for each satellite is matched to a particular set of orbital parameters. In practice, each DGPS correction has associated with it an identifier, known as the IODE, and this is a copy of the orbital parameter's identifier. Simple "book-keeping", which involves the caching of orbital parameters and their identifiers, assures that the differential correction terms are matched to the orbit parameters used in computing the GPS solution.

Still another source of error that can cause drift or jumps in standalone GPS positions are troposphere model inaccuracies. These errors tend to be small for the most part, because the delay to the ranging signal caused by the troposphere can be modeled to less than one meter of error using relatively simple models.

In conclusion, many applications that previously required DGPS while SA was employed still require some form of DGPS. The need is even more pronounced for aerial applications where frequent banking of the aircraft causes satellites to continuously enter into, or exit out of view of the GPS receiver. Without some form of differential correction, the resulting computed position jumps would be intolerable.

SUMMARY OF THE INVENTION

The fact that SA is disabled has brought forth new opportunities. Fortunately, all remaining sources of error in a GPS position computation are slowly varying in nature and the variation is somewhat predictable. For example, as a satellite rises in the sky, the transmitted signal, as viewed from a GPS receiver, contains different levels of ionospheric distortion. Modeling the ionosphere as a simple shell, results in a reasonable estimate of how the signal varies. Such a model states (see, for example RTCA/DO-229A, page A-45) that the ionosphere-induced delay is roughly three times larger for satellites viewed near the horizon than it is for satellite's viewed near the zenith. This scaling of the ionosphere delay is known as an obliquity factor. So, if the ionosphere delay is known at one point, then using the obliquity factor, the change in ionosphere can be predicted as the satellite traverses the sky. The same concept holds true for troposphere induced delays, only the obliquity factor is different.

The atomic clocks onboard the GPS satellites are also vary stable, and any drift they may possess is modeled fairly well by parameters broadcast in the GPS navigation message. So other than jumps caused by modeling parameter updates, the drifts in GPS clocks, after applying the model can be less than a meter per day. The positions of the orbiting satellites have also been modeled to within a few of meters by parameters broadcast in the GPS navigation message. Furthermore, errors in orbit position are slow changing and to a large degree, can be treated as errors in the GPS clock.

With the sources of error being small or slowly changing, especially when assisted by simple models, it follows that we could still use differential GPS but update the differential correction terms far less often than was previously necessary (when SA was on). In fact, once every hour or so may be sufficient. However, if this is the case, then the requirement of two or more receivers to produce a differentially corrected GPS solution can be reduced to one GPS receiver. That single receiver can act both as the reference station, producing the original set of differential correction terms, and then as the remote receiver using that set differential correction terms. All the while, the receiver updates the correction terms with simple models reflecting changes in the atmospheric delays. Not only does this scheme remove the cost of a receiver, but it also eliminates the communication link between receivers. A subject, which has been previously disclosed, as in for example U.S. Pat. No. 5,345,245 by Ishikawa, et al. and U.S. Pat. No. 5,589,835 by Gildea, et al. This disclosure introduces a simple but novel approach to relative GPS positioning using a single GPS receiver unit.

Of course, with relative positioning, it is still necessary to have the position of the reference location. A matter simply addressed if relative accuracy is indeed all that is required. For first time operation in a new geographic area, the reference location may be determined as the position of the GPS receiver as computed from the ensemble of the non-differentially corrected GPS range measurements at some point prior to going into differential mode. For future use in the same area a new reference may be determined, or the location may be retrieved from computer memory (or other sources) after having returned to a mark for which this location was determined. The location would have been determined in a past operation of relative DGPS positioning.

IN THE DRAWINGS

Referring now to the drawings wherein like elements are numbered alike in the several figures.

DETAILED DESCRIPTION OF THE PREFERRED EMBODIMENT

Figure 1A:
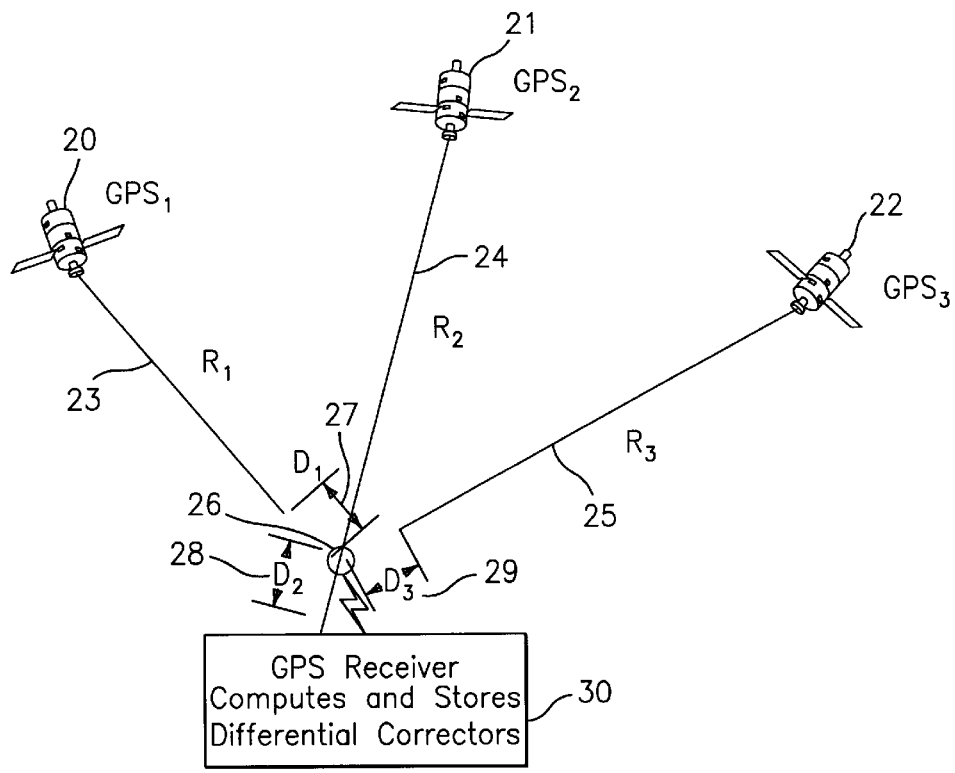
FIGS. 1A and 1B are diagrams that depict the initial determination of the differential correction terms (FIG. 1A) and the subsequent application of these differential correction terms (FIG. 1B).

The accompanying drawings depict various aspects and features of a preferred embodiment of the invention. By way of illustration as described herein, it may be applied to agriculture. While a preferred embodiment is shown and described, it will be appreciated by those skilled in the art that the invention is not limited to agricultural applications, but may be applied in any capacity where position detection is required.

In a preferred embodiment of the disclosed invention, a single GPS receiver operates in a manner that, beforehand, was only possible with two or more GPS receivers. In essence, the single GPS receiver operates as both a reference receiver and a remote receiver. Enabling accurate relative positioning of the receiver without the nuisance of position jumps and other problems associated with standalone GPS positioning. Now with SA disabled, and due to the stability of the GPS satellite's onboard clocks, the errors associated with the GPS measurement are slowly varying. Enough so, that the single GPS receiver can compute GPS differential correction terms for all satellites in view at one instant of time and then store these differential correction terms for future use, perhaps for time spans exceeding several hours when atmospheric model adjustments are applied. Furthermore, the receiver can save waypoints while acting with differential correction terms, and return to these waypoints at future times to re-compute the differential correction terms, extending the receivers differentially-corrected operation time indefinitely.

One may view the invention as follows. A GPS receiver receives and processes satellite information from GPS satellites or other related types. For example: Global Navigation Satellite System (GLONASS), Wide Area Augmentation Systems (WAAS), European Geostationary Navigation Overlay System (EGNOS), Mobile Satellite (MSAT), or Global Navigation Satellite Systems (GNSS). The GPS receiver computes differential correction terms at some instant in time $t_k$. These corrections are nothing more that residual errors relative to an assumed true location, similar to what is done in commercially available DGPS reference stations. A period of "warm-up" (2 minutes or so) time is desirable so that the carrier smoothing has the opportunity to reduce noise in the range measurements and the corresponding residual measurements. In this embodiment, the true location is either the GPS receiver's computed location at the instant of time $t_k$, computed using the standalone GPS data, or it is achieved by placing the receiver over a known location and informing the receiver of this location's coordinates (by a command, memory retrieval, etc.).

At the instant of time, $t_k$, as the residual measurements are taken, the GPS receiver computes, using models, the delays associated with ionosphere and troposphere. These delays are subtracted from the residual measurements so that the residuals now contain what are predominantly satellite-associated errors such as clock and orbit errors. These adjusted residuals, which become the future basis for the differential correction terms, are stored into computer memory. They are readily available for use at future instances of time, so the computer's memory takes the place of a communication link that was required for prior mechanizations of DGPS requiring two or more receivers. We refer to these correctors as reference clock corrections.

At times in the future of $t_k$, new differential correction terms are formed, typically each time that the GPS receiver's position is computed. They are formed by adding the current ionosphere and troposphere model delays to the reference clock corrections that have been saved into memory. These model delays are typically different from those delays that were present at time $t_k$, primarily due to the ever-changing obliquity of the utilized satellites as they traverse the sky. Nevertheless, the change is simply accounted for by adding the new model values back in. It is worth noting that modeling error will slowly creep into the GPS position solution to the degree that the models are inadequate in describing the true changes in the atmospheric delay quantities. Still, it is only the change in these quantities that has significance. The absolute value of the atmospheric delay is not significant because it is absorbed into the original reference clock corrections. Consequently, the initial relative accuracy of the system will be high, degrading with time. Such degradation has be shown through testing to be relatively slow, taking up to an hour or more before positions reach one meter of horizontal error. Thus, a user is given time to complete a short duration task such as spraying a field. Furthermore, occasional re-calibration of the receiver by returning to a marked location can extend the operation time indefinitely.

One of the key advantages of differential GPS is that it helps to prevent sudden excursions in the receiver's reported position due to changes in measured quantities that are not properly accounted for with standalone GPS but are accounted for by the differential correction terms. Because the primary content of the differential correction terms described herein are computed only once, extra steps are required to properly deal with sudden change in measured quantities. Two categories of potential excursions (or position jumps) that are given special treatment in this disclosure are: 1) position jumps induced by the addition of a satellite for which a differential correction does not presently exist, such as when the satellite rises above the horizon, and 2) position jumps caused by changes in parameters that model the satellite's orbit trajectory and clock offset.

The first source of position jump can be avoided altogether if new satellites are ignored for the period of receiver operation or until a re-calibration of the receiver's differential capability is invoked. Alternatively, the satellite may be used if dealt with in a fashion similar to that used to compute the original set of reference clock corrections. All that is required is that a rising satellite, one that is without computed differential correction terms, be tracked but not used in the GPS position solution for some prescribed period of time while noise is averaged out of the satellite's range measurement (using carrier phase smoothing). Once the satellite is ready for inclusion into the GPS solution, its reference clock correction is generated based upon the receiver's current, best estimate of its own location. From that point onward, the differential correction is available and the new satellite may be incorporated into the GPS position solution along with the other existing satellites. In practice, it will often be desirable to wait until a new satellite is fairly high in the sky before proceeding to compute its differential correction terms. This will minimize effects of noise that is more pronounced at low elevations, such as multi-path, and it will decrease the dependency on the ionosphere and troposphere models' level of accuracy. Ionosphere and troposphere induced delays are much more pronounced at low elevations and will decrease significantly as the satellite rises in the sky. In this embodiment, a smoothing delay of 2 minutes is used and the satellite is required to be above 15 degrees of elevation angle before it can be included. However, various smoothly delays and mask elevation angles are possible.

The second source of potential position jumps, those caused by updates to the orbit and clock parameters, can be avoided in two ways. One is to simply continue using the original set of parameters and discard any new sets. This could lead to slowly accumulating position errors if the operation of the receiver continues far into the region of time over which the old parameters are no longer valid. This is because the parameters are intended to specify the satellite's orbit trajectory over a finite interval of time over which the GPS Control Segment originally computed them; typically, this interval is 4 hours. The approach used here is simply to use the new parameters, but account for any range jumps associated with the switch to the new parameters. Jumps in range are computed, on a one-time basis, as the transition to the new parameters occurs. Basically, the change in orbital position, projected along the line-of-sight to the user is one source of jump. The other is the change in the GPS satellite's clock-drift modeling terms. Both changes are computed for the same instant of time, the differential correction terms are adjusted accordingly (to remove the jump) and the adjustment is than applied to all future range measurements.

As mentioned earlier, the relative accuracy of the GPS receiver's location will typically be quite good at the onset of applying the differential correction terms discussed. As time progresses the accuracy will degrade slightly and a recalibration of the reference position will be desirable. However, in many instances it will be convenient to return to a known location. For example, this may be the location at which the original set of differential correction terms was computed. It may also be a location that is physically marked and has had its position coordinates previously determined during GPS receiver's differentially corrected mode of operation. It might also be a position determined by an additional sensor system or input. For example, an altimeter gyroscope inertial measurement system, or compass system. In either case, the reference location coordinates have been stored, and are readily available for the purpose of this re-calibration. In the re-calibration process, the current reference clock corrections are discarded and the process of computing new ones is simply repeated. The receiver then begins renewed operation with high relative accuracy. With this re-calibration approach, the receiver's operation can be extended indefinitely. In fact, the receiver could be turned off and then later begin a new period of operation, producing positions relative to the original, saved reference. For example, in agriculture, a farmer using the GPS receiver to precisely control farm equipment one year could reproduce his previous year's swaths or contours by simply keeping a landmark available at which to calibrate the GPS receiver.

FIG. 1 shows the initial determination and subsequent application of the differential correction terms disclosed by this invention. In FIG. 1A, the point 26 represents the reference point at which the differential correction terms 27–29 are computed. The differential correction terms 27–29 are the residual errors that result from differencing the measured ranges, 23–25, determined from signals transmitted from satellites 20–22 from the "true" ranges. The "true" ranges are geometrically calculated as the distance from the reference location 26 to each GPS satellite 20–22 with each satellite's location determined from ephemeris (orbit) parameters that are broadcast in the GPS signal. The measured ranges 23–25 do not typically equal the geometric ranges due to various sources of error, including ionospheric delay, tropospheric delay, satellite clock errors, receiver clock errors, receiver location error, and noise effects. In a preferred embodiment, ionospheric and tropospheric delays are estimated using models and these models are continuously applied during differential operation to account for the changing nature of the delays.

Figure 1B:
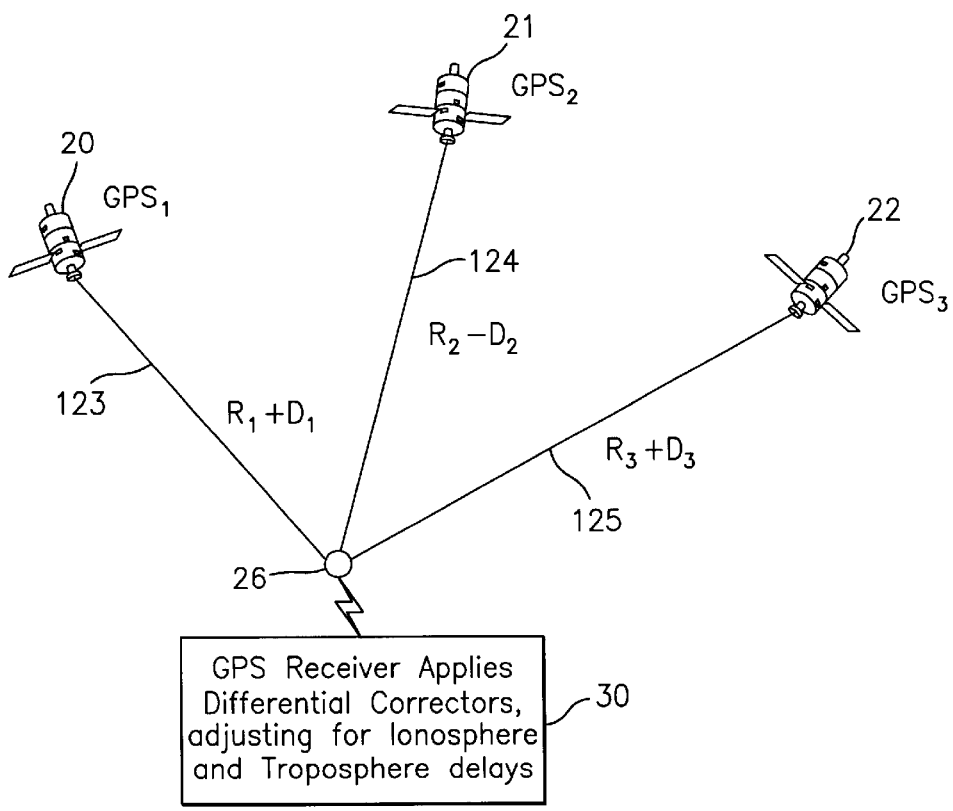

In FIG. 1B, the differential correction terms have been added to, or subtracted from (depending on the mathematical sign conventions) the measured ranges 123–125. FIG. 1B shows that with application of the differential correction terms, the error sources 27–29 depicted in FIG. 1A are eliminated from the measurements.

Figure 2B:
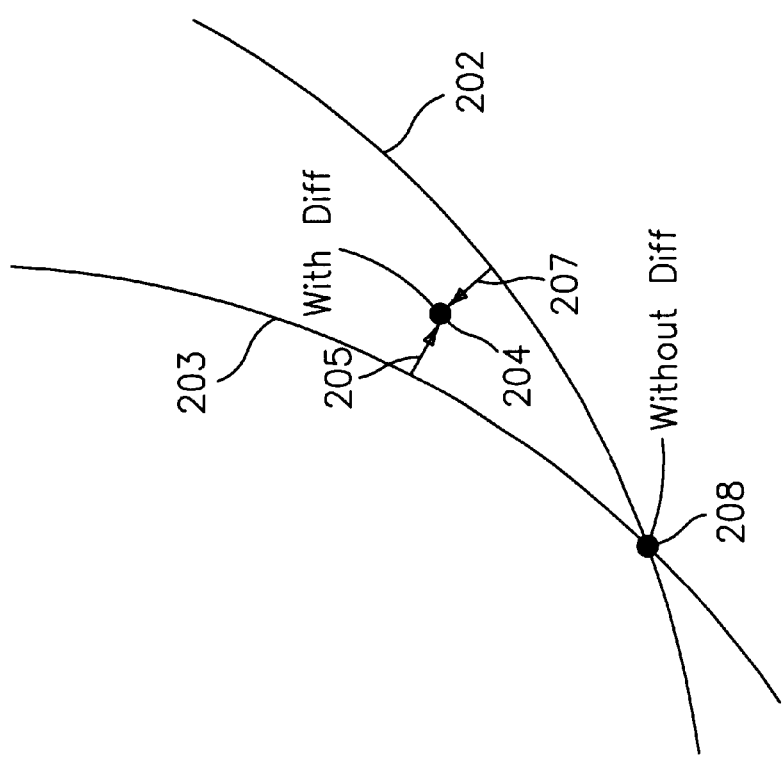
FIGS. 2A and 2B are diagrams representing the application of differential correction terms both before (FIG. 2A) and after (FIG. 2B), a GPS satellite has become unavailable for use in computing the location. Both differentially and non-differentially corrected position results are shown in FIG. 2B illustrating the need for differential GPS.
Figure 2A:
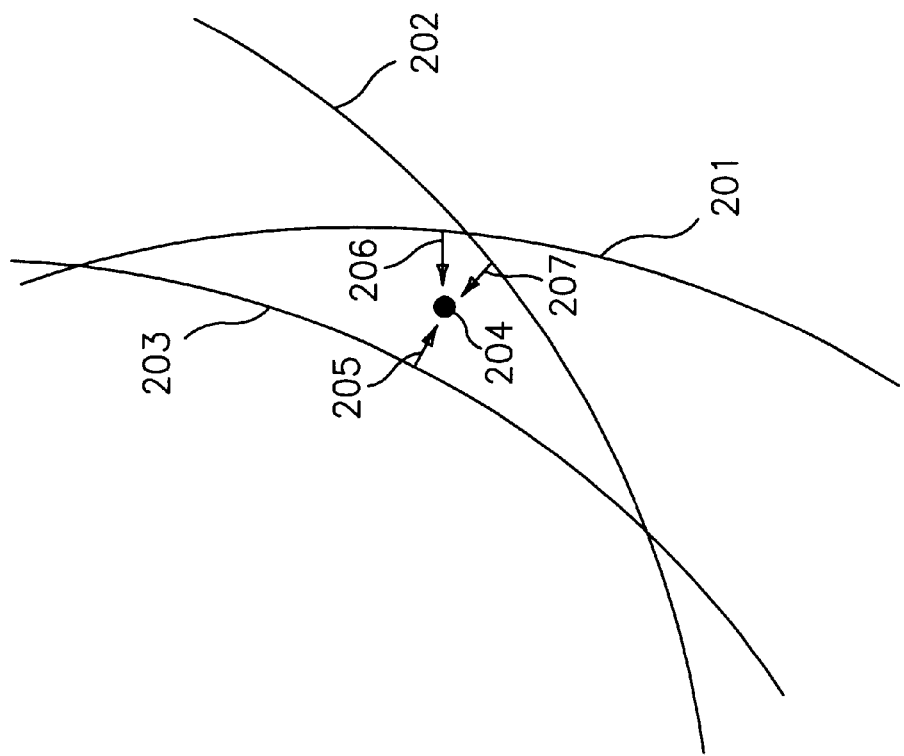

FIG. 2A depicts a simplified, two-dimensional GPS location determination. A set of arcs are shown with each arc, 201–203, representing the envelope of points for which the GPS receiver should lie, given the measured range to a GPS satellite residing at the center of the circle that defines arc. In this simplified two-dimensional case, the receiver's own clock offset is ignored so that the presence of two arcs is enough to determine the receiver's location; this location being the intersection of the two arcs. When three arcs are present, as in FIG. 2A, a common point of intersection may not exist due to un-modeled errors 205–207, but using an over determined Least Squares mathematical approach, the GPS location is taken as the point 204 at which the sum of (squared) error terms is minimized. Assuming FIG. 2A applies to the time at which a reference location is determined and differential correction terms are computed, then error terms 205–207 become the differential correction terms (using the appropriate sign). Consequently, by subsequently adding the differential correction terms to the measured ranges, the radius of the arcs are altered in such a way that a common intersection exists.

In FIG. 2B, only two arcs 202–203 are shown, as it is assumed that one GPS satellite has dropped from view. Without the use of differential correction terms, the GPS location is determined as the intersection of the two remaining arcs and is represented in the figure as point 208. This shows a sudden excursion from the location 204 that was determined using Least Squares approach applied to the three satellite arcs of FIG. 2A. However, when the differential correction terms 205 and 207 are added to the two remaining range measurements, the location is determined once again at point 204, and the position does not jump. Consequently, one advantage of using differential GPS positioning is that position jumps resultant from loss of a satellite are avoided (or at least reduced). When error sources are removed by applying the differential correction terms, the resulting GPS location is less susceptible to loss of satellite range information.

Figure 3:
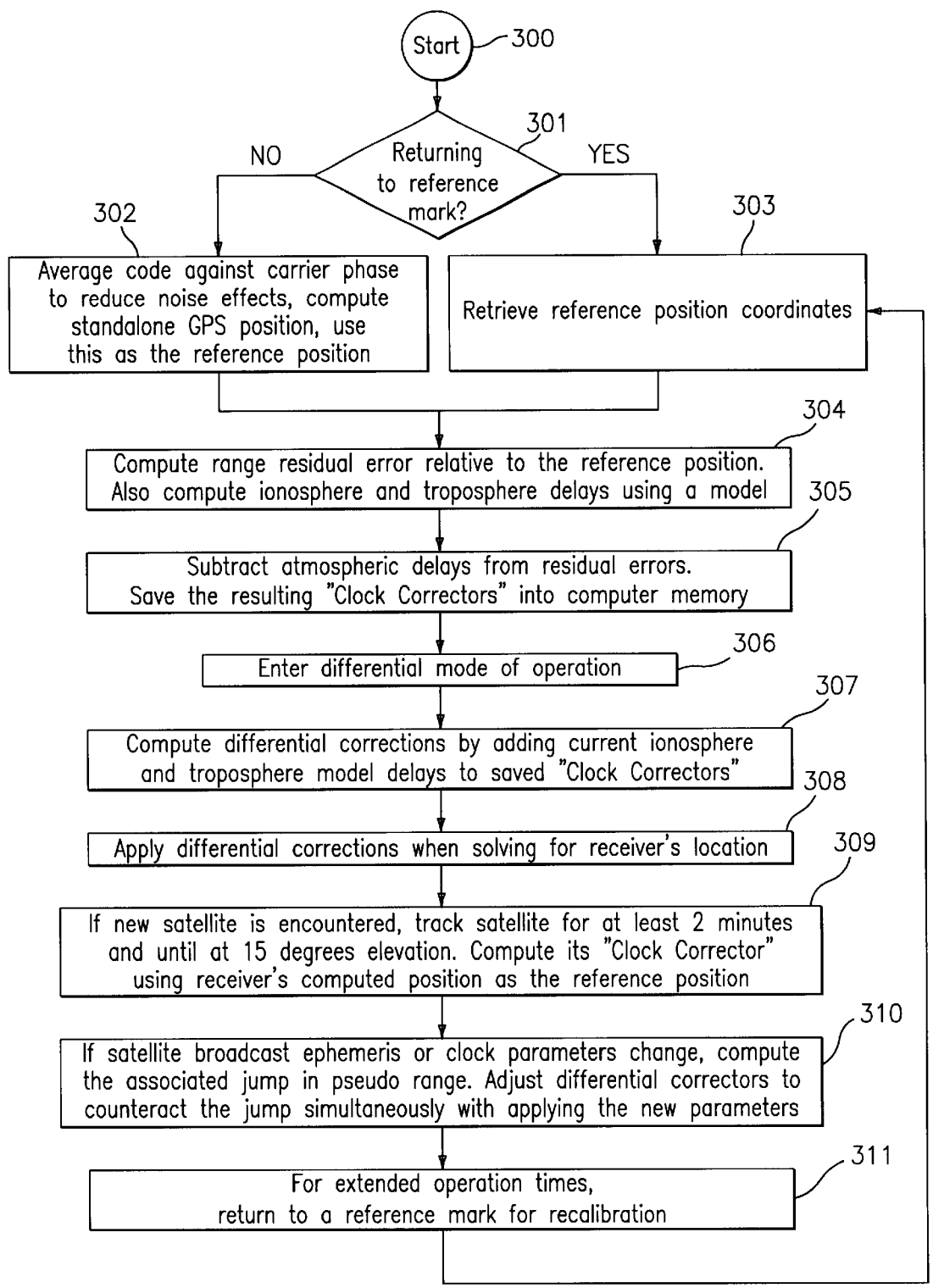
FIG. 3 is a block diagram that illustrates the steps involved in a realization of a preferred embodiment.

FIG. 3 is a block-diagram that illustrates the preferred method of computing and using differential correction terms within a single GPS receiver unit. At some initial time, the GPS receiver must determine whether it is starting at a new location that is to become the reference location, or if it is returning to a reference location, for which the coordinates are known. This decision is depicted in step 301 of the figure.

If returning to a known reference location, as in step 303, the reference location coordinates a retrieved from memory and the process of computing differential correction terms begins. If the receiver is currently using differential correction terms, these corrections are discarded so that the new ones can take their place.

If the GPS receiver does not have, stored within memory or otherwise made available, the reference location coordinates for a nearby reference, or if a new or re-computed reference location is desired, then step 302 is invoked. Here, the GPS receiver is allowed to average out noise effects prior to computing the reference location. The receiver accomplishes this by smoothing code-range against carrier-range measurements for each GPS satellite observed. The code-range measurements are obtained by measuring the time-latency relative to the GPS receiver's clock, of a pattern modulated upon the transmitted GPS signal. This time-latency, when multiplied by the speed of light, gives the an indication of the satellites distance relative to the receiver and is often referred to as a pseudorange since it includes the clock error of the GPS receiver's clock. Carrier-range is measured by counting cycles and fractional cycles of the transmitted GPS signal with each cycle representing a distance of one carrier wavelength; about 19 centimeters. Carrier-range is a very precise measurement, much more so than code-range, but it has inherent within it an unknown number of carrier wavelengths that cannot be accounted for. To take advantage of its precise nature, however, carrier range is utilized to smooth the measurements of code-range as the following equation shows:

$$R_{Smooth}(k) = \alpha[R_{Smooth}(k-1) + R_{carrier}(k) - R_{carrier}(k-1)] + \beta R_{code}(k) \quad (1)$$

where
 $R_{smooth}$ is the smoothed range
 $R_{code}$ is the measured code range
 $R_{carrier}$ is the measured carrier range
 $\alpha$ and $\beta$ are smoothing coefficients with $\alpha$ between 0 and 1 and $\beta = (1-\alpha)$
and
 k and k−1 represent the current time, and the previous time at which the measurements were taken, respectively. All quantities in the range equations identified herein are expressed in, or converted to, the common unit of meters.

Once sufficient time (about 2 minutes) has elapsed over which the measured ranges have been smoothed, the process of computing the differential correction terms begins. This is process is illustrated in steps 304 and 305 of FIG. 3. If the receiver has been operational for several minutes prior to the reference location determination, then the user of the GPS receiver is not required to wait for the smoothing operation to complete since ranges are already smooth.

In step 304, the residuals are computed. The residuals are the difference between (smoothed) measured range and geometric range where the process of determining geometric range requires that the receiver's location be known along with the location of the GPS satellite. The satellite location coordinates are determined in the manner described in ICD-GPS-200 using the most recent broadcast ephemeris model. The receiver's location coordinates are computed using the available GPS measurements or they are retrieved from computer memory where they were saved previously at the present location. If computed, a standalone GPS location is determined using the available range measurements and the models of ionospheric and tropospheric effects so that the location is as accurate as possible relative to the GPS World Geodetic System 1984 (WGS-84) reference frame. WGS-84 is the standard global reference frame for GPS positioning and satellite locations are expressed in WGS-84 coordinates.

For a given GPS satellite, the residual needed for computing the clock correctors can be expressed by the following equation:

$$\text{Residual}(t_k) = R_{measured}(t_k) + \tau_{sv,est}(t_k) - \tau_{rcvr,est}(t_k) - R_{geometric} \quad (2)$$

$$R_{geometric}(t_k) = \|\vec{r}_{sv,est}(t_k) - \vec{r}_{rcvr,est}(t_k)\| \quad (3)$$

where
 $t_k$ is the instant of time at which the differential clock corrections are to be computed.
 $R_{measured}(t_k)$ is the measured range at time $t_k$, smoothed using carrier phase.
 $\tau_{sv}(t_k)$ is the satellite's clock error at time $t_k$.
 $\tau_{rcvr}(t_k)$ is the receiver's clock error at time $t_k$.
 $\vec{r}_{sv}(t_k)$ is the location vector of the GPS satellite time $t_k$.
 $\vec{r}_{rcvr}(t_k)$ is the location vector of the receiver at time $t_k$.
and the subscript "est" means estimated, the subscript "sv" applies to the GPS satellite and the subscript "rcvr" applies to the GPS receiver. We keep in mind that $t_k$ is adjusted for signal propagation delays when computing quantities associated with the satellite.

Ignoring noise terms, and other less significant effects, the measured range can be expressed as $$R_{measured}(t_k) = \|\vec{r}_{sv,true}(t_k) - \vec{r}_{rcvr,true}(t_k)\| - \tau_{sv,true}(t_k) + \tau_{rcvr,true}(t_k) + T_{iono,true}(t_k) + T_{tropo,true}(t_k) \quad (4)$$

where
 $T_{iono}(t_k)$ is the ionospheric delay at time $t_k$
 $T_{tropo}(t_k)$ is the tropospheric delay at time $t_k$
and the subscript "true" means that these are true quantities and are not estimated from models.

To simplify the ensuing analysis, we ignore the receiver's clock error, $\tau_{rcvr}$ since it effects all measurements equally, is solved for in each GPS solution iteration, and is irrelevant in determining the receiver's location. So ignoring this term, substituting equations (3) and (4) into equation (2) and then linearizing the result gives.

$$\text{Residual}(t_k) = (\vec{e}_{rcvr}(t_k) \cdot \vec{u}(t_k)) - (\vec{e}_{sv}(t_k) \cdot \vec{u}(t_k)) + (\tau_{sv,est}(t_k) - \tau_{sv,true}(t_k)) + T_{iono,true}(t_k) + T_{tropo,true}(t_k) \quad (5)$$

$$\vec{u}(t_k) = \frac{(\vec{r}_{sv,est}(t_k) - \vec{r}_{rcvr,est}(t_k))}{\|\vec{r}_{sv,est}(t_k) - \vec{r}_{rcvr,est}(t_k)\|} \quad (6)$$

$$\vec{e}_{rcvr}(t_k) = \vec{r}_{rcvr,est}(t_k) - \vec{r}_{rcvr,true}(t_k) \quad (7)$$

$$\vec{e}_{sv}(t_k) = \vec{r}_{sv,est}(t_k) - \vec{r}_{sv,true}(t_k) \quad (8)$$

As can be seen,
 $\vec{u}(t_k)$ is a unit vector from the receiver to the satellite at time $t_k$.
 $\vec{e}_{rcvr}(t_k)$ is a vector expressing the error between the receiver's estimated location and its true location in WGS-84 coordinates.
 $\vec{e}_{sv}(t_k)$ is a vector expressing the error between the satellite's estimated location and its true location in WGS-84 coordinates.

The linearization that has been applied to produce equation (5) is mathematically the same as is used in solving the GPS location using Least Squares or a Kalman Filter. The vector $\vec{e}_{rcvr}(t_k)$ becomes a row of what is commonly referred to as the observation matrix.

The differential clock corrector is computed by subtracting from the residual of equation (5), the ionosphere and troposphere delays determined from models and then negate the result. That is, $$\text{Diff}_{clock} = -(\text{Residual}(t_k) - T_{iono,est}(t_k) - T_{tropo,est}(t_k)) \quad (9)$$

The estimated ionosphere delay, $T_{iono,est}$, in this embodiment, is produced using the Klobuchar model, a model that is continually adjusted by the GPS Control Segment to agree with the current level of the ionosphere. The coefficients for this model are contained within the broadcast GPS Navigation data. The estimated, $T_{tropo,est}$ delay is taken from the model recommended by RTCA/DO-229A in Appendix A, p. A-11.

As shown in step 305 of FIG. 3, the clock correctors, $\text{Diff}_{clock}$ are saved into computer memory, one for each satellite that has been processed. The entire set of satellites in view of the GPS receiver that are also above a user-defined elevation mask (10 degrees is recommended) are processed at time $t_k$ according to the above equation. Consequently, a complete set of clock corrections are obtained and saved.

Once the system enters into differential mode of operation, as depicted in step 306, each differential clock correction is added to the corresponding measured range, while the current model of the ionospheric and tropospheric delays are subtracted. This is shown in step 307. Thus, at some future time $t_m$, the residual after applying the differential correction becomes $$\text{Residual}_{diff}(t_m) = (\vec{e}_{rcvr}(t_m) \cdot \vec{u}(t_m)) - (\vec{e}_{sv}(t_m) \cdot \vec{u}(t_m)) + (\tau_{sv,est}(t_m) - \tau_{sv,true}(t_m)) +$$
$$T_{iono,true}(t_m) + T_{tropo,true}(t_m) - T_{iono,est}(t_m) - T_{tropo,est}(t_m) + \text{Diff}_{clock} \quad (10)$$

where again, the terms involving the receiver's clock have been omitted for simplicity and because they are irrelevant to the end result. In equation (10), the subscript "diff" was added to the residual to clearly indicate that this is the residual that arises after applying the differential correction terms.

Now the following assumptions are made:

1. The satellite clock error relative to the model as given by $(\tau_{sv,true} - \tau_{sv,est})$ is nearly constant over the duration of times between $t_k$ and $t_m$.

2. The term $\vec{e}_{sv} \cdot \vec{u}$ does not change appreciably between the times $t_k$ and $t_m$.

Assumption 1 simply means that the satellite's onboard clock does not drift relative to the model used in estimating the satellite's clock offset over the time duration of interest. This is usually the case due to the high-stability of the GPS atomic clocks.

Assumption 2 means that the orbit errors, when projected along a line-of-sight to the user, are nearly constant or are relatively small. Actually, it is usually a combination of these two characteristics that make the assumption valid. That is: 1) the errors are small, often less than two meters in the direction of the user and 2) they are somewhat invariant to the line of sight over the time between $t_k$ and $t_m$ which is usually limited to an hour or two. As a further note, orbit errors tend to remain constant relative to a coordinate system that is rigidly fixed to the satellite and such a coordinate system rotates, at a rough approximation, with the vector $\vec{u}$.

Substituting equations (9) and (5) into equation (10), and zeroing the terms which cancel from the above two assumptions yields $$\text{Residual}_{diff}(t_m) = (\vec{e}_{rcvr}(t_m) \cdot \vec{u}(t_m)) - (\vec{e}_{rcvr}(t_k) \cdot \vec{u}(t_k)) + (\Delta_{iono,true} - \Delta_{iono,est}) + (\Delta_{tropo,true} - \Delta_{tropo,est}) \quad (11)$$

where $$\Delta_{iono,true} = T_{iono,true}(t_m) - T_{iono,true}(t_k). \quad (12)$$

$$\Delta_{iono,est} = T_{iono,est}(t_m) - T_{iono,est}(t_k). \quad (13)$$

$$\Delta_{tropo,true} = T_{tropo,true}(t_m) - T_{tropo,true}(t_k). \quad (14)$$

$$\Delta_{tropo,est} = T_{tropo,est}(t_m) - T_{tropo,est}(t_k). \quad (15)$$

For short periods of time, we can also make the assumption that the unit vector from receiver to satellite does not change significantly, at least in the context the magnitudes of the dot products shown in equation 11. For longer periods of time, for example 1 hour, this unit vector may change by 30 degrees, but if the absolute position error is relatively small, then the dot product terms still are small. Consequently, we may write $$\vec{u} = \vec{u}(t_m) \approx \vec{u}(t_k) \quad (16)$$

Furthermore, assume that change in the modeled ionosphere and troposphere delays are approximately equal to the changes in the true delays. That is $$\xi_{iono} = (\Delta_{iono,true} - \Delta_{iono,est}) \approx 0 \quad (17)$$

$$\xi_{tropo} = (\Delta_{tropo,true} - \Delta_{tropo,est}) \approx 0 \quad (18)$$

Then equation (11) becomes $$\text{Residual}_{diff}(t_m) \approx (\vec{e}_{rcvr}(t_m) - \vec{e}_{rcvr}(t_k)) \cdot \vec{u} + (\xi_{iono} + \xi_{tropo}) \approx (\vec{e}_{rcvr}(t_m) - \vec{e}_{rcvr}(t_k)) \cdot \vec{u} \quad (19)$$

Then if the receiver's estimated position is offset from the true position by the same amount at times $t_k$ and $t_m$, then $$\vec{e}_{rcvr}(t_m) - \vec{e}_{rcvr}(t_k) = \vec{0} \quad (20)$$

and so $$\text{Residual}_{diff}(t_m) \approx 0 \quad (21)$$

Equation (21) holds for each satellite, as long as the conditions of equations (16), (17) and (18) are met for each satellite and the estimate of the receiver's location has not changed, relative to its true location, as is shown in equation (20). In fact, if equations (16), (17), and (18) hold, then by solving the Least Squares equations (or Kalman Filter equations) that not only give an estimate of position but also minimize the residual errors, the estimated position will be such that equation (20) holds. This is the important result. It means that if the differential correction terms described herein are applied, then under the right conditions the estimate of the receiver's location will be such that it maintains a constant offset relative to the receiver's true location in some global reference frame (WGS-84 in this illustration). This is all that is required and is the fundamental concept of differential positioning.

The assumptions of equations (16), (17), and (18) will always be met when the time between $t_k$ and $t_m$ is very small. However, these assumptions will tend to be less valid as time progresses. Consequently, receiver accuracy at time $t_k$ will be high, but will slowly degrade. This degradation has been shown, using a prototype system, to be often less than one meter of horizontal error per hour. Still, there are a number of precautions that may help minimize the effects of accuracy degradation.

A first precaution would be to use the best ionosphere and troposphere model available and if possible, augment these models with real measurements of the ionospheric and tropospheric delays or with information from other sensors that can improve the fidelity of the models. One example would be downloading ionosphere data from a worldwide network of receivers, such as the IGS.

Secondly, if the receiver is to be operated for long periods of time where equation (16) may not hold, then minimize the errors in the reference location relative to the global WGS-84 coordinate system by averaging the standalone receiver's position over a sufficient period of time. The reason that this is beneficial is that it causes the term $(\vec{e}_{rcvr}(t_k) \cdot \vec{u}(t_k))$ to approach zero because $\vec{e}_{rcvr}(t_k)$ is approaching zero. This has the same effect as satisfying the condition of equation (16).

In this case, the term $\vec{e}_{rcvr}(t_k)$ will also be forced to zero by solving the Least-Squares (or Kalman filter) equations, and receiver's location at time $t_m$ will be accurate relative to WGS-84.

Another precaution would be to raise the elevation mask of the GPS receiver to avoid utilizing satellites that are near the horizon for which the ionospheric and troposphere affects are more pronounced. This reduces the dependency on the accuracy of the models.

In step 309, if a new satellite is encountered, for which there is no differential correction terms, equation (9) is applied to the new satellite. This time the receiver uses it's currently computed differential location as the reference location. It is desirable to wait until the satellite has been tracked for a sufficient time to average out noise affects in the range measurement. Again, it is also beneficial to reduce the dependency on the ionospheric and tropospheric models by allowing the satellite to rise to approximately 15 degrees of elevation above the horizon.

Step 310 is necessary to deal with the update of the navigation parameters describing the satellite's clock drift (the clock coefficients) and orbit trajectory (the ephemeris parameters). To avoid jumps associated with switching to the new set of parameters, a one-time correction is computed and added to the clock corrector terms, $\text{Diff}_{clock}$.

Figure 4:
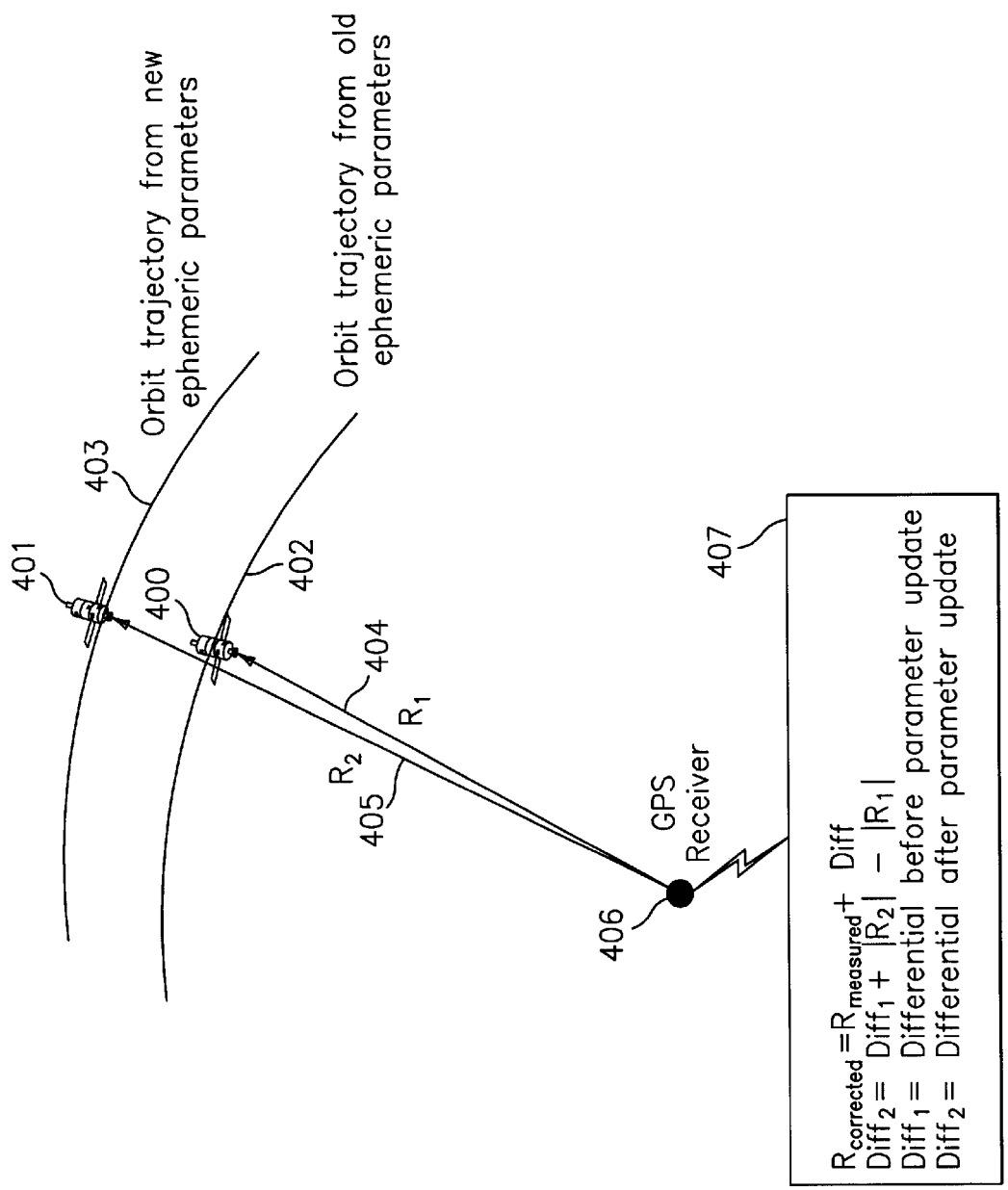
FIG. 4 is a diagram that pictorially illustrates the method by which changes in ephemeris parameters are taken into account during the extended use of the differential correction technique described herein.

In FIG. 4, the effect of updates to satellite ephemeris is depicted. The range to the satellite is computed both before 402 and after 403 the switchover to the new ephemeris parameters. The trajectories resulting from the use of these parameters are shown as 402 (old parameter set) and 403 (new parameter set). Also shown are the two geometric ranges 404 and 405 for the old and new parameters, respectively. The change in these geometric ranges is used, along a computed change in the clock model to make the one-time adjustment as follows.

$$\text{Diff}_{clock} = \text{Diff}_{clock} + \alpha 1 + \alpha 2, \text{ (a one-time adjustment as the new parameters are applied)} \quad (22)$$

$$\alpha 1 = \|\vec{r}_{sv,est,new}(t_n) - \vec{r}_{rcvr,est}(t_n)\| - \|\vec{r}_{sv,est,old}(t_n) - \vec{r}_{rcvr,est}(t_n)\| \quad (23)$$

$$\alpha 2 = \tau_{sv,est,old}(t_n) - \tau_{sv,est,new}(t_n) \quad (24)$$

$t_n$ is the time at which the new ephemeris and clock parameters are applied $\vec{r}_{rcvr,est}(t_n)$ is the estimate of the receiver's position at time $t_n$ $\vec{r}_{sv,est,old}(t_n)$ is the satellite's position at time $t_n$ computed from the old set of parameters $\vec{r}_{sv,est,new}(t_n)$ is the satellite's position at time $t_n$ computed from the new set of parameters $\tau_{sv,est,old}(t_n)$ is the satellite's clock error at time $t_n$ computed from the old set of parameters $\tau_{sv,est,new}(t_n)$ is the satellite's clock error at time $t_n$ computed from the new set of parameters An alternative embodiment, which can also be used to circumvent jumps associated with parameter updates, is not to use the new parameters at all and instead continue to use the old ones. This approach is effective for shorter periods of operation that do not extend far beyond the region of validity of the parameters. Yet another embodiment, that does allow extended times, is to update parameters at the same instant that the receiver re-calibrates its differential correction terms after returning to a marked reference position.

The Klobuchar parameters, broadcast within the GPS navigation message, also change occasionally. The best way of avoiding jumps associated with these parameters changing is to only use the new ones when the receiver is re-calibrated.

The final step 311 is a method to extend operation time of operation by re-calibrating the differential correction terms. In this step, the receiver is returned to a location that was previously marked and for which the location coordinates were recorded (they are recorded into the receivers memory in the present embodiment). Here the receiver re-calibrates its differential correction terms by simply re-computing them at the marked location, using the known coordinates of this location as the reference. This restores the level of the receiver's accuracy since the freshly computed differential correction terms have not yet degraded due to the slow divergence of ionospheric and tropospheric model delays from the true delays. With this re-calibration approach, the receiver's operation can be extended indefinitely. In fact, the receiver could be turned off and then later begin a new period of operation, producing positions relative to the original, saved reference.

The disclosed invention may be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or as data signal transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for determining location coordinates relative to a reference location, the method comprising:

receiving a plurality of satellite signals with a receiver, said plurality of satellite signals transmitted from a plurality of satellites;

determining a plurality of pseudoranges to said plurality of satellites by measuring timing patterns contained within said plurality of satellite signals;

establishing said reference location at a known location;

determining a plurality of true ranges between said reference location and each satellites of said plurality of satellites;

determining a plurality of error terms by forming a difference between each true range of said plurality of true ranges and each corresponding pseudorange of said plurality of pseudoranges, respectively;

calculating a plurality of correction terms by mathematically removing predictable inaccuracies from said plurality of error terms;

retaining said plurality of correction terms;

combining said correction terms with subsequent measured pseudoranges when computing feature locations of said receiver; and wherein said receiver acts first as a reference receiver; computing said plurality of correction terms, and then as a remote receiver; applying said plurality of correction terms when computing its location.

2. The method of claim 1, wherein said receiver processes information from GPS, GLONASS, WAAS, EGNOS, MSAT or other GNSS satellites.

3. The method of claim 1, further comprising calculating a clock adjustment and a range adjustment if satellite parameters change.

4. The method of claim 1, further comprising applying a clock correction if a new satellite is encountered.

5. The method of claim 1, wherein said receiver periodically calibrates said plurality of correction terms by returning to a known location.

6. The method of claim 1, wherein said plurality of correction terms is retained collectively as a model.

7. The method of claim 6, wherein said plurality of correction terms is retained as an ionospheric delay model.

8. The method of claim 6, further comprising: adjusting said model to eliminate estimated errors; and deriving said plurality of correction terms from said adjusting.

9. The method of claim 6, wherein an ionosphere model is uploaded to said receiver periodically.

10. The method of claim 6, wherein an ionospheric error term is estimated.

11. The method of claim 1, wherein a weighting scheme is used to change a relative importance of said plurality of correction terms when mathematically solving for a location of said receiver.

12. The method of claim 1, wherein said receiver is coupled to aiding devices comprising altimeters, inertial measurement units, compasses, gyroscopes, wheel rotation sensors, velocity sensors, or accelerometers.

13. The method of claim 12, wherein said aiding devices are utilized to augment said calculating of said plurality of correction terms.

14. The method of claim 12, wherein said receiver re-calibrates its position by knowing a partial set of location coordinates.

15. The method of claim 1, wherein said receiver re-calibrates its position using a form of dead reckoning.

16. The method of claim 1, wherein said predictable inaccuracies are determined from mathematical models.

17. The method of claim 1, wherein said predictable inaccuracies are measurements facilitating determination of said plurality of error terms.

18. The method of claim 1, wherein said predictable inaccuracies are received from an external source having knowledge of said plurality of error terms.

19. The method of claim 1, wherein said retaining may include computer memory, disk, an attachment to said receiver, or other mediums of retention.

20. A storage medium encoded with a machine-readable computer program code for determining location coordinates relative to a reference location, said storage medium including instructions for causing a computing system to implement a method comprising:

receiving a plurality of satellite signals with a receiver, said plurality of satellite signals transmitted from a plurality of satellites;

determining a plurality of pseudoranges to said plurality of satellites by measuring timing patterns contained within said plurality of satellite signals;

establishing said reference location at a known location;

determining a plurality of true ranges between said reference location and each satellites of said plurality of satellites;

determining a plurality of error terms by forming a difference between each true range of said plurality of true ranges and each corresponding pseudorange of said plurality of pseudoranges, respectively;

calculating a plurality of correction teems by mathematically removing predictable inaccuracies from said plurality of error terms;

retaining said plurality of correction terms;

combining said correction terms with subsequent measured pseudoranges when computing future locations of said receiver; and wherein said receiver acts first as a reference receiver; computing said plurality of correction terms, and then as a remote receiver; applying said plurality of correction terms when computing its location.

21. The storage medium of claim 20, wherein said receiver processes information from GPS, GLONASS, WAAS, EGNOS, MSAT or other GNSS satellites.

22. The storage medium of claim 20, further including instructions for causing a computing system to implement a method comprising: calculating a clock adjustment and a range adjustment if satellite parameters change.

23. The storage medium of claim 20, further including instructions for causing a computing system to implement a method comprising: applying a clock correction if a new satellite is encountered.

24. The storage medium of claim 20, wherein said receiver periodically calibrates said plurality of correction terms by returning to a known location.

25. The storage medium of claim 20, wherein said plurality of correction terms is retained collectively as a model.

26. The storage medium of claim 25, wherein said plurality of correction terms is retained as an ionospheric delay model.

27. The storage medium of claim 25, further including instructions for causing a computing system to implement a method comprising: adjusting said model to eliminate estimated errors; and deriving said plurality of correction terms from said adjusting.

28. The storage medium of claim 25, wherein an ionosphere model is uploaded to said receiver periodically.

29. The storage medium of claim 25, wherein an ionospheric error term is estimated.

30. The storage medium of claim 20, wherein a weighting scheme is used to change a relative importance of said plurality of correction terms when mathematically solving for a location of said receiver.

31. The storage medium of claim 20, wherein said receiver is coupled to aiding devices comprising altimeters, inertial measurement units, compasses, gyroscopes, wheel rotation sensors, velocity sensors, or accelerometers.

32. The storage medium of claim 31, wherein said aiding devices are utilized to augment said calculating of said plurality of correction terms.

33. The storage medium of claim 31, wherein said receiver re-calibrates its position by knowing a partial set of location coordinates.

34. The storage medium of claim 20, wherein said receiver re-calibrates its position using a form of dead reckoning.

35. The storage medium of claim 20, wherein said predictable inaccuracies are determined from mathematical models.

36. The storage medium of claim 20, wherein said predictable inaccuracies are measurements facilitating determination of said plurality of error terms.

37. The storage medium of claim 20, wherein said predictable inaccuracies are received from an external source having knowledge of said plurality of error terms.

38. The storage medium of claim 20, wherein said retaining may include computer memory, disk, an attachment to said receiver, or other mediums of retention.

39. A computer data signal for determining location coordinates relative to a reference location, said computer data signal comprising code configured to cause a processor to implement a method comprising:

receiving a plurality of satellite signals with a receiver, said plurality of satellite signals transmitted from a plurality of satellites;

determining a plurality of pseudoranges to said plurality of satellites by measuring timing patterns contained within said plurality of satellite signals;

establishing said reference location at a known location;

determining a plurality of true ranges between said reference location and each satellites of said plurality of satellites;

determining a plurality of error terms by forming a difference between each true range of said plurality of true ranges and each corresponding pseudorange of said plurality of pseudoranges, respectively;

calculating a plurality of correction terms by mathematically removing predictable inaccuracies from said plurality of error terms;

retaining said plurality of correction terms;

combining said correction terms with subsequent measured pseudoranges when computing future locations of said receiver; and wherein said receiver acts first as a reference receiver; computing said plurality of correction terms, and then as a remote receiver; applying said plurality of correction terms when computing its location.

40. The computer data signal of claim 39, wherein said receiver processes information from GPS, GLONASS, WAAS, EGNOS, MSAT or other GNSS satellites.

41. The computer data signal of claim 39, further comprising code configured to cause a processor to implement a method comprising: calculating a clock adjustment and a range adjustment if satellite parameters change.

42. The computer data signal of claim 39, further comprising code configured to cause a processor to implement a method comprising: applying a clock correction if a new satellite is encountered.

43. The computer data signal of claim 39, wherein said receiver periodically re-calibrates said plurality of correction terms by returning to a known location.

44. The computer data signal of claim 39, wherein said plurality of correction terms is computer data signaled collectively as a model.

45. The computer data signal of claim 44, wherein said plurality of correction terms is retained as an ionospheric delay model.

46. The computer data signal of claim 44, further comprising code configured to cause a processor to implement a method comprising: adjusting said model to eliminate estimated errors; and deriving said plurality of correction terms from said adjusting.

47. The computer data signal of claim 44, wherein an ionosphere model is uploaded to said receiver periodically.

48. The computer data signal of claim 44, wherein an ionospheric error term is estimated.

49. The computer data signal of claim 39, wherein a weighting scheme is used to change a relative importance of said plurality of correction terms when mathematically solving for a location of said receiver.

50. The computer data signal of claim 39, wherein said receiver is coupled to aiding devices comprising altimeters, inertial measurement units, compasses, gyroscopes, wheel rotation sensors, velocity sensors, or accelerometers.

51. The computer data signal of claim 50, wherein said aiding devices are utilized to augment said calculating of said plurality of correction terms.

52. The computer data signal of claim 50, wherein said receiver re-calibrates its position by knowing a partial set of location coordinates.

53. The computer data signal of claim 39, wherein said receiver re-calibrates its position using a form of dead reckoning.

54. The computer data signal of claim 39, wherein said predictable inaccuracies are determined from mathematical models.

55. The computer data signal of claim 39, wherein said predictable inaccuracies are measurements facilitating determination of said plurality of error terms.

56. The computer data signal of claim 39, wherein said predictable inaccuracies are received from an external source having knowledge of said plurality of error terms.

57. The computer data signal of claim 39, wherein said retaining may include computer memory, disk, an attachment to said receiver, or other mediums of retention.

* * * * *

UNITED STATES PATENT AND TRADEMARK OFFICE
CERTIFICATE OF CORRECTION

PATENT NO. : 6,397,147 B1
DATED : May 28, 2002
INVENTOR(S) : Michael L. Whitehead It is certified that error appears in the above-identified patent and that said Letters Patent is hereby corrected as shown below:

Title page,
Item [56], References Cited, U.S. PATENT DOCUMENTS, delete "4,813,991 A    3/1989            Hatch    364/458";

Column 2,
Line 3, before "-Wellenhof", delete "Hofiann" and insert therefor -- Hofmann --;
Line 22, before "Thus,", delete "receivers)." and insert therefor -- receiver(s) --;
Line 54, after "that", insert -- is --;

Column 3,
Line 6, after "that", delete "maybe" and insert therefor -- may be --;

Column 5,
Line 53, after "more", delete "that" and insert therefor -- than --;

Column 9,
Line 18, after "the", insert -- receiver --;
Line 48, after "This", delete "is";

Column 10,
Line 44, after "gives", delete ".";

Column 12,
Line 21, after "context", insert -- of --;

Column 13,
Line 38, after "uses", delete "it's" and insert therefor -- its --;
Line 59, after "along", insert -- with --;

Column 15,
Line 19, after "each", delete "satellites" and insert therefor -- satellite --;
Line 45, before "said", delete "calibrates" and insert therefor -- re-calibrates --;

Column 16,
Line 30, after "each", delete "satellites" and insert therefor -- satellite --;
Line 59, after "periodically", delete "calibrates" and insert therefor -- re-calibrates --; and

UNITED STATES PATENT AND TRADEMARK OFFICE
CERTIFICATE OF CORRECTION

PATENT NO. : 6,397,147 B1
DATED : May 28, 2002
INVENTOR(S) : Michael L. Whitehead It is certified that error appears in the above-identified patent and that said Letters Patent is hereby corrected as shown below:

<u>Column 17,</u>
Line 49, after "each", delete "satellites" and insert therefor -- satellite --.

Signed and Sealed this

Twenty-fifth Day of October, 2005

JON W. DUDAS
*Director of the United States Patent and Trademark Office*